No. 685,490. Patented Oct. 29, 1901.
C. ROBINSON.
VALVE GEAR FOR ENGINES.
(Application filed Apr. 27, 1900.)

(No Model.) 5 Sheets—Sheet 1.

WITNESSES:
C. L. Belcher
Birney Hines

INVENTOR
Cyrus Robinson
BY
Sibley G. Carr
ATTORNEY.

No. 685,490. Patented Oct. 29, 1901.
C. ROBINSON.
VALVE GEAR FOR ENGINES.
(Application filed Apr. 27, 1900.)
(No Model.) 5 Sheets—Sheet 4.

WITNESSES:
C. L. Belcher
Birney Hines

INVENTOR
Cyrus Robinson
BY Wesley G. Carr
ATTORNEY.

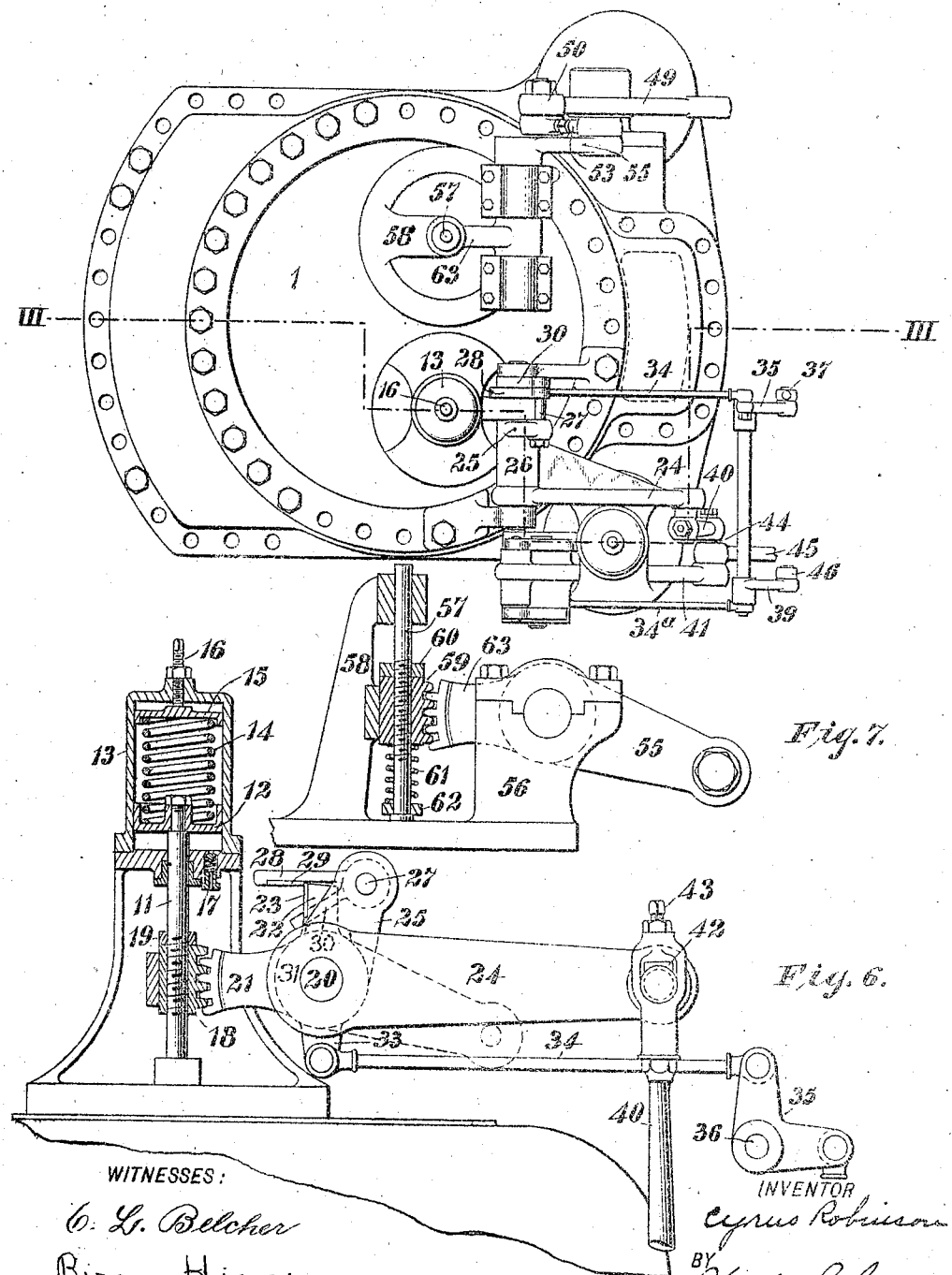

UNITED STATES PATENT OFFICE.

CYRUS ROBINSON, OF EDGEWOOD PARK, PENNSYLVANIA, ASSIGNOR TO THE WESTINGHOUSE MACHINE COMPANY, A CORPORATION OF PENNSYLVANIA.

VALVE-GEAR FOR ENGINES.

SPECIFICATION forming part of Letters Patent No. 685,490, dated October 29, 1901.

Application filed April 27, 1900. Serial No. 14,620. (No model.)

*To all whom it may concern:*

Be it known that I, CYRUS ROBINSON, a subject of the Queen of Great Britain, residing at Edgewood Park, in the county of Allegheny and State of Pennsylvania, have invented a new and useful Improvement in Valve-Gear for Fluid-Pressure Engines, of which the following is a specification.

My invention relates to engines operated by steam or other fluid under pressure, and particularly to mechanism for operating the inlet and exhaust valves of such mechanism.

The object of my invention is to provide a simple and efficient mechanism for operating the inlet and exhaust valves of fluid-pressure engines in such manner as to insure the admission of fluid-pressure to the cylinders during approximately the full stroke of the piston and to quickly and accurately cut off the supply to the cylinder when the desired limit has been reached. With these ends in view I have devised the means shown in the accompanying drawings, in which—

Figure 1:
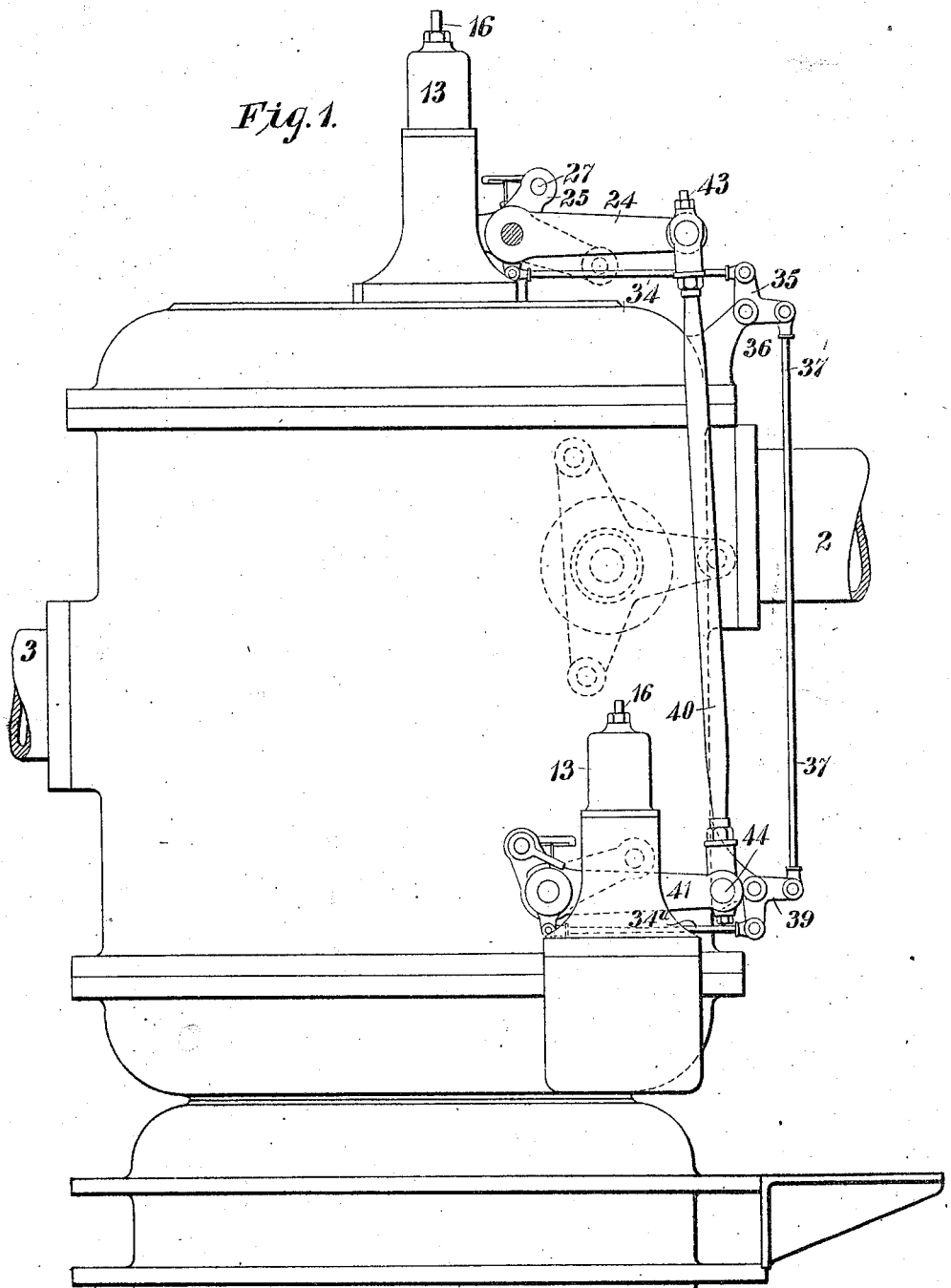
Figure 2:
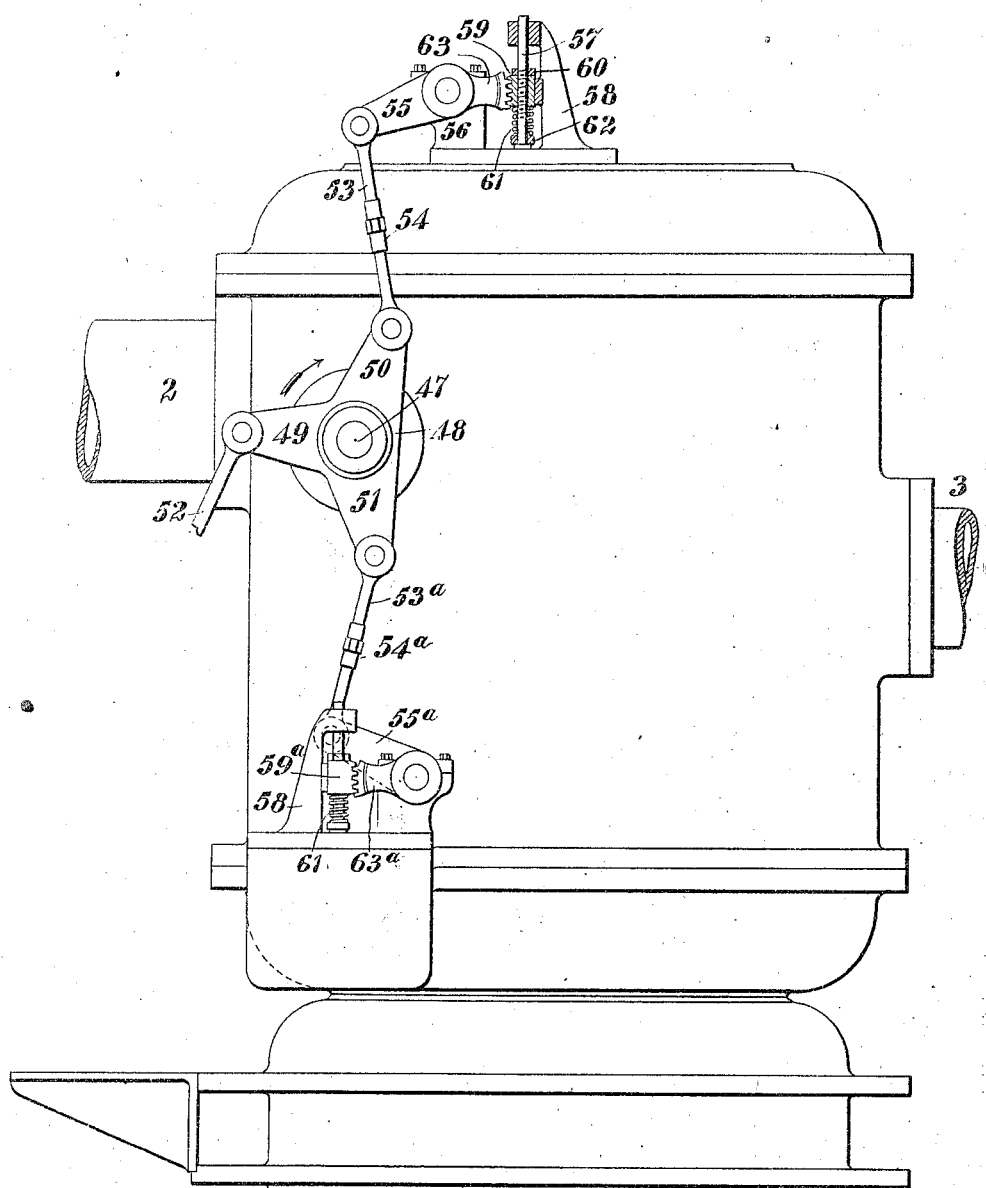
Figure 3:
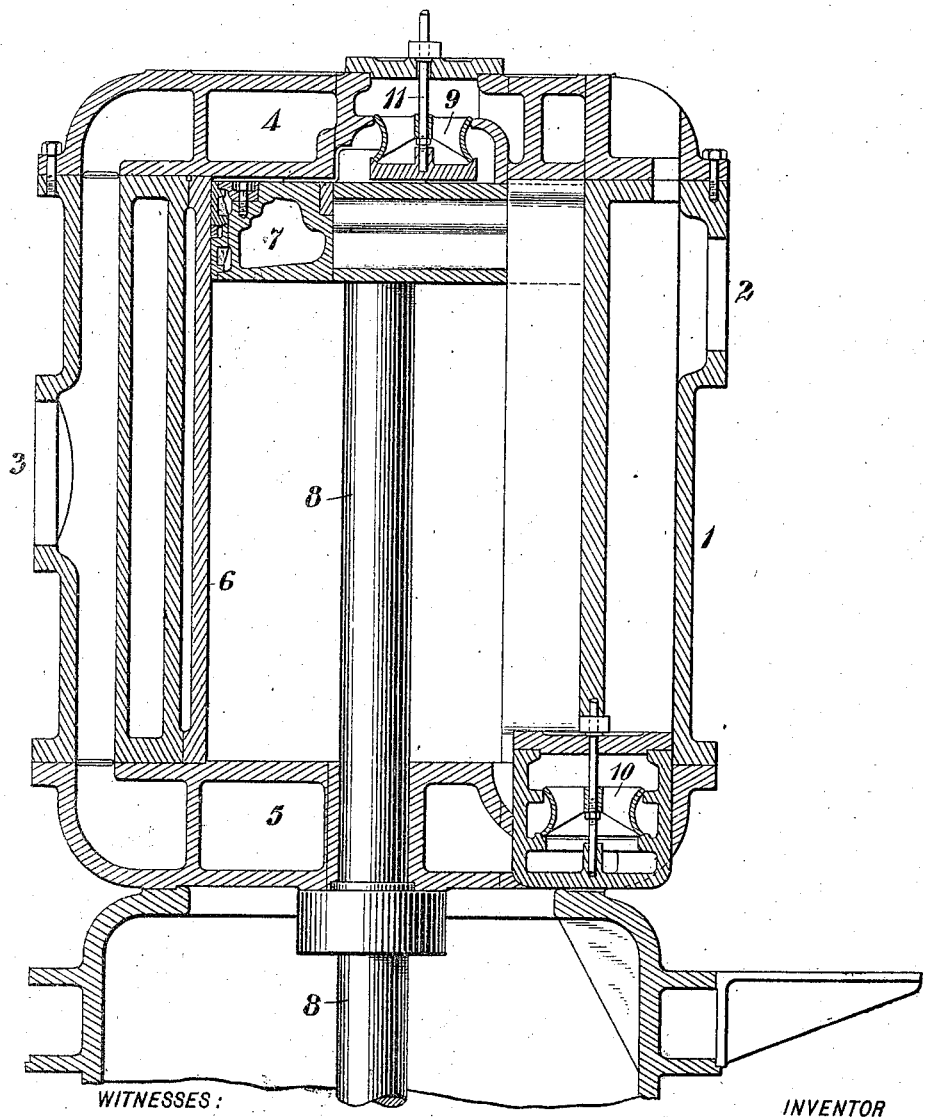
Figure 4:
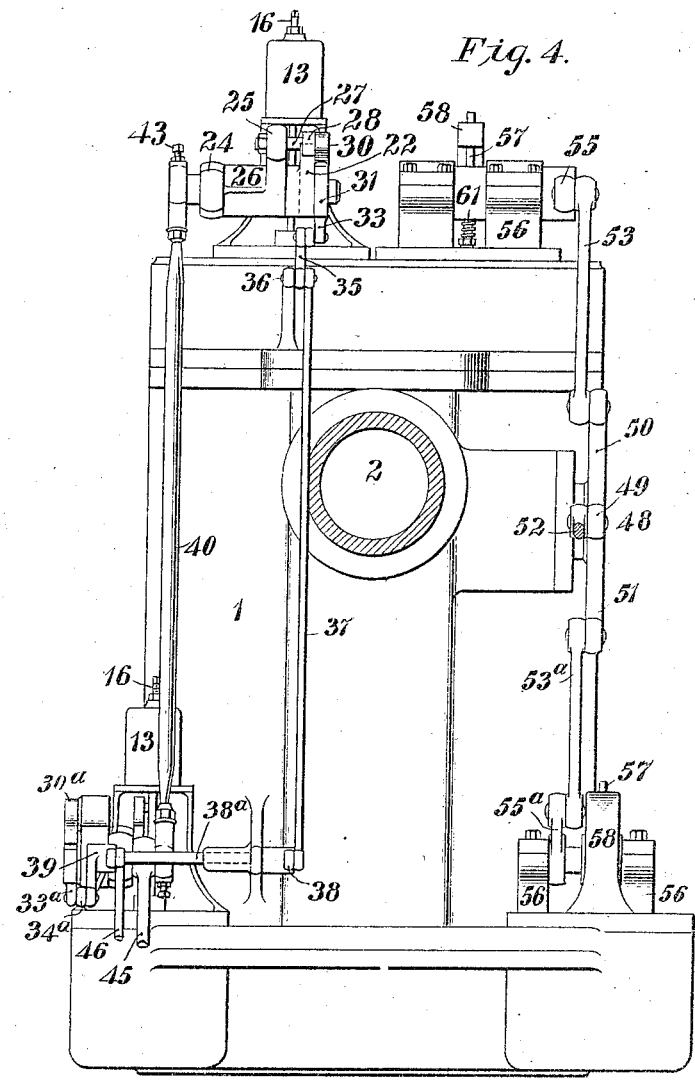
Figure 5:
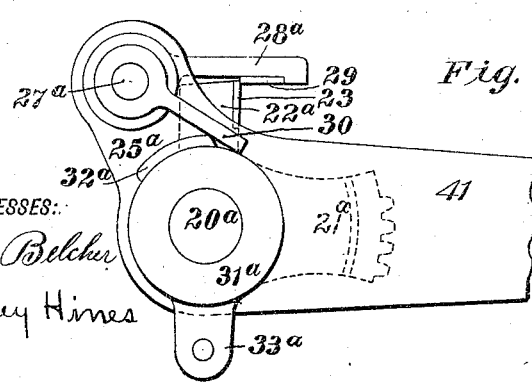

Figure 1 is a side elevation of the cylinder-containing portion of a vertical steam-engine, a portion of the frame supporting the same, and the valve-operating mechanism. Fig. 2 is a view similar to Fig. 1, but showing the opposite side of the apparatus. Fig. 3 is a vertical section taken on line III III of Fig. 8. Fig. 4 is a rear elevation of the apparatus shown in Figs. 1 and 2. Fig. 5 is a detail view of a portion of the operating mechanism for the lower inlet-valve. Fig. 6 is a view, partially in side elevation and partially in section, of the operating mechanism for the upper inlet-valve. Fig. 7 is a view, partially in side elevation and partially in section, of the mechanism for operating the upper exhaust-valve. Fig. 8 is a plan view of the apparatus shown in Figs. 1, 2, 3, and 4.

The mechanism shown and described is employed in connection with a vertically-acting steam-engine; but this presentation of the invention is not intended as a limitation to steam-engines of any special form or type, or, in fact, to steam-engines as distinguished from engines operated by any other fluid under pressure. For convenience of description steam will be assumed to be the fluid employed. Such assumption is made for no other purpose, however, and is expressly disclaimed as a limitation upon the invention.

The engine-cylinder 1 has an inlet-port 2 at one side and an outlet-port 3 at the other, which communicate, through suitable passages in the upper and lower cylinder-heads 4 and 5, with the interior of the liner 6 in accordance with the operation of the valves, which will be hereinafter described, so as to reciprocate the piston, which is connected with the engine-shaft by the rod 8 and a pitman and crank (not shown) in the usual manner. Each of the valves is of the puppet type, and both of the inlet-valves 9 and 10 are connected to a single eccentric and open upwardly, the bottom valve 10 being offset from the cylinder to permit of this mode of operation. The exhaust-valves are also both operated from a single eccentric and occupy substantially the same relative positions as the two inlet-valves.

The valve 9, for admitting steam to the cylinder above the piston, is provided with a stem 11, that projects upwardly through a suitable stuffing-box, and at its upper end is provided with a piston 12, that operates in a cylinder 13, a coiled spring 14 being located in the cylinder above the piston and having its upper end engaged by a disk 15, that is adjustable by means of a screw 16, projecting through the top of the cylinder. The bottom of the cylinder is provided with an adjustable release-valve 17, so that the rapidity of the downward movement of the piston under the action of the spring may be adjusted as may be desired. The spring will serve to automatically close the valve when permitted to act, as will be readily understood; but any other suitable means may be employed, and hence I do not desire to limit my invention to what is here shown. For example, air under suitable pressure may be employed in lieu of the spring for forcing the piston downward, or a vacuum-pot construction, such as is ordinarily employed for closing Corliss-engine valves, may be used in lieu of the construction shown.

Adjustably mounted on the stem 11 below the closing-valve just described is a rack 18, the adjustment of which is effected by means of a screw-threaded connection with the stem, a lock-nut 19 being also employed in connection therewith. Any other adjusting means that is found suitable and desirable may be employed.

Loosely mounted upon a shaft 20, that is supported in suitable bearings on the upper cylinder-head adjacent to the valve 9, is a gear-segment 21, the teeth of which mesh with the rack 18 on the piston-stem 11 and the hub of which is provided with an upwardly-projecting block 22, the two being preferably integral. The face of this block adjacent to the valve-stem is provided with a case-hardened-steel face 23, the purpose of which will be hereinafter stated.

Rigidly mounted upon the shaft 20 is the inner end of an operating-lever 24, such inner end being provided with an upwardly-projecting arm 25, the two being either rigidly fastened together or constituting integral parts of the same structure, they being shown in the drawings as joined by means of an integral sleeve 26. (See Fig. 8.) Rigidly mounted in the upper end of the arm 25 is a pin 27, on which is rigidly mounted a laterally-projecting arm 28, the lower face of which is provided with a case-hardened-steel plate 29, the inner edge of which constitutes a hook for engagement with the steel face 23 of the block 22 on the gear-segment 21. The pin 27 is also provided with a knock-off lever or arm 30, that is suitably keyed or splined thereto or otherwise fastened so as to have no movement of rotation thereon, this arm or lever having a certain definite angular position with reference to the hooked arm 28. Loosely mounted on the shaft beneath the knock-off lever 30 is a sleeve 31, having a cam 32 so located as to engage the knock-off lever at the proper time, and thus raise it and the hook so as to release the block 22, the operation of these parts being hereinafter more fully set forth. The sleeve 31 is also provided with a downwardly-projecting lug or ear 33, to which is pivoted one end of a horizontally-extending reach-rod 34, the outer end of this rod being pivoted to one arm of a bell-crank lever 35, that is mounted on a suitable pin or stud 36. The other arm of the bell-crank lever is connected, by means of a vertical rod 37, to an arm 38, that is rigidly mounted on one end of a horizontal rock-shaft 38ª, the other end of said shaft being provided with a bell-crank lever 39, like lever 35, but reversely disposed.

The outer end of the lever 24 is connected, by means of a rod 40, to a lever 41, pivoted adjacent to the lower inlet-valve 10, so that the two levers 24 and 41 will be operated in unison. The length of this connecting-rod 40 is adjustable in order that the valve-operating mechanism may be adjusted to such length of stroke as may be desired, the adjusting means here shown being a longitudinally-movable bearing-block 42 in each end of the rod and an adjusting-screw 43 for moving such block longitudinally in its seat. Any other suitable adjusting means may be employed, if desired.

The lower inlet-valve 10 and the means for closing it may be the same as the corresponding parts located at the upper end of the cylinder and which have already been described. The mechanisms for opening and closing the lower inlet-valve are also the same as those already described, except that the shaft 20ª, on which the lever 41, the gear-segment 21ª, and the sleeve 31ª are mounted, is located on the opposite side of the valve, and consequently the gear-segment, the block 22ª, the arm 25 and its pin 27ª, hooked arm 28ª, and knock-off lever 30ª, and the cam 32ª are oppositely disposed from the corresponding parts already described, this arrangement being made in order that the two valves may be reversely operated—that is to say, so that when one is closed the other is opened, and vice versa, this being obviously necessary in order that the piston may be reciprocated in the desired manner.

The pin 44, which connects the lower end of the connecting-rod 40 to lever 41, also carries one end of a rod 45, that is connected at its other end to an eccentric on the main shaft of the engine, such part being of usual construction well known in the art, and therefore not shown. The bell-crank lever 39 is also connected, by means of a suitable rod 46, to the engine-governor, which is not shown and which may be of any well-known type that is suitable for the purpose. The mechanism for closing the inlet-valve 10 may be the same in construction as that employed for closing the valve 9, and I have therefore deemed it unnecessary to repeat the illustration and description of such mechanism.

Mounted on a suitable short shaft or stud 47 at the side opposite to the mechanism just described is a wrist-plate 48, having three arms 49, 50, and 51, the laterally-projecting arm 49 being connected, by means of a rod 52, to an eccentric (not shown) on the main shaft of the engine. The upper arm 50 of wrist-plate is connected, by means of a link or rod 53, the length of which is preferably adjustable, as indicated at 54, to the outer end of a lever 55, said lever being pivotally mounted upon a suitable bracket 56, supported by the upper head-plate of the cylinder adjacent to the upper exhaust-valve. The stem 57 of this exhaust-valve has its upper end supported in a bearing in a suitable bracket 58, and loosely mounted upon this stem is a rack 59, the upward movement of which on the stem is limited by a collar 60 and the downward movement by a coiled spring 61, located between the rack and a collar 62, rigidly fastened upon the stem. The inner end of the lever 55 is provided with a gear-segment 63, that meshes with the rack 59 on the piston-stem. The lower arm 51 of the wrist-plate is similarly connected to one end of an arm 55ª by means of a link or rod 53ª, the length of which is adjustable, as indicated at 54ª, the valve-operating parts being the same as those already described, except that the gear-segment 63ª and the rack 59ª, coöperating therewith, are oppositely disposed in order that the two exhaust-valves may be opened and also closed in alternation. It will be seen that if the exhaust-valve-operating mechanisms are actuated by the eccentric from the positions indicated in Fig. 2 of the drawings, assuming that the first movement is in the direction indicated by the arrow, the upper valve will be opened by reason of the lever-and-rod connection and the engagement of the rack on the valve-stem with the collar above it. The movement of the arm 51 beyond the position in which it is shown in the drawings obviously serves to depress the rack on the stem of the lower valve; but since this rack is loose on the stem it will merely compress the coiled spring without moving the valve or placing any injurious strain upon it or the other parts. When the eccentric moves the wrist-plate in the direction opposite that indicated by the arrow, the lower valve will be opened in the manner just described and the coiled spring between the rack and the collar on the upper valve-stem will permit the arm 50 to pass over beyond the center in the manner already described with reference to the lower arm 51.

The operation of the inlet-valves is as follows: Assuming that the eccentric on the main shaft is in such position that its movement will carry the connecting-rod 40 upward, this movement will carry the upper hooked arm 28 toward the corresponding valve and the lower arm 28ª away from the corresponding or lower valve. The lower arm, being in engagement with the block 22ª, will move the gear-segment, and consequently the rack, and thus open the valve while the upper arm is moving over into position to engage the corresponding block. With this movement of the parts the steam, which is admitted below the piston, will obviously move the piston upward, and if the parts are properly adjusted the steam will be admitted until the piston has nearly completed its stroke, when the lower knock-off lever will engage the corresponding cam and move the hook sufficiently to release the block, when the spring 14 will instantly close the valve. When this point is reached, the upper hook will have moved over to engage the corresponding block and the eccentric will move the parts in the opposite direction, the hook carrying the block, and consequently the gear-segment and the rack, so as to open the upper valve while the arm 28ª is moved to again engage its block. This operation will be repeated so long as the engine is in operation.

It will be understood without further description that the governor of the engine will serve, through the bell-crank levers and connecting-rods, to so adjust the position of the cams as to insure the movement of the knock-off levers at such times as will properly control the speed of the engine.

It will be readily seen that the mechanism shown is simple in construction and positive in operation and that it insures a supply of steam to the cylinder for almost the full length of the piston-stroke, which is an important feature and a material improvement over the valve mechanisms heretofore employed in the art.

I desire it to be understood that the details of the apparatus may be modified within considerable limits without departing from the spirit and scope of the invention.

I claim as my invention—

1. In a valve-gear for steam-engines, the combination with puppet inlet-valves located respectively at opposite ends of the engine-cylinder and means for closing each of said valves, of a rack and a gear-segment for opening each of said valves, lever-and-hook mechanism for actuating said gear-segments, connections between said lever-and-hook mechanisms whereby they are operated simultaneously in opposite directions and means for releasing each valve-opening means from the corresponding hook-and-lever mechanism when the desired point in the stroke of the piston is reached.

2. In a valve-gear for steam-engines, the combination with puppet inlet-valves located respectively at opposite ends of the engine-cylinder and a spring for closing each of said valves, of a rack and a gear-segment for opening each of said valves, lever-and-hook mechanism for actuating said gear-segment, connections between said lever-and-hook mechanisms whereby they are operated simultaneously in opposite directions and a knock-off cam and lever for releasing each valve-opening gear-segment from the corresponding hook-and-lever mechanism when the desired point in the stroke of the piston is reached.

3. In a valve-gear for steam-engines, the combination with inlet-valves located respectively at opposite ends of the engine-cylinder and a spring for closing each of said valves, of a rack and a gear-segment for opening each of said valves, lever-and-hook mechanism for actuating said gear-segment, connections between said lever-and-hook mechanisms whereby they are operated simultaneously in opposite directions and a knock-off cam and lever for releasing the gear-segment from the hook-and-lever mechanism when the desired point in the stroke of the piston is reached.

4. In a valve-gear for steam-engines, the combination with inlet-valves located respectively at opposite ends of the engine-cylinder and a spring for closing each valve, pivoted levers having hooked arms, connections between said levers whereby they are simultaneously actuated in opposite directions, racks on the valve-stems and gear-segments engaging the said racks and having projections extending into the paths of movement of the hooked arms and knock-off devices for releasing the respective gear-segments from the hooked arms when the engine reaches approximately the corresponding ends of its stroke.

5. In a valve-gear for steam-engines, the combination with inlet-valves located respectively at opposite ends of the engine-cylinder, a spring for closing each of said valves, of a rack and a gear-segment for opening each valve, lever-and-hook mechanism for actuating said gear-segments, connections between said lever-and-hook mechanisms whereby they are simultaneously operated in opposite directions, a knock-off cam and lever for releasing each gear-segment from the corresponding hook-and-lever mechanism and means for automatically adjusting the position of the cam in accordance with the load upon the engine.

6. In a valve-gear for steam-engines, the combination with inlet-valves located respectively at opposite ends of the engine-cylinder and a spring acting continuously upon each valve to force it to its seat, of a valve-raising gear for each valve, an operating lever and hook for each valve-raising gear, connections for actuating said levers and hooks simultaneously and hook-releasing devices for each valve, the operative positions of which are dependent upon the engine-governor.

7. In a valve-gear for steam-engines, the combination with inlet and exhaust valves located at the ends of the engine-cylinder, and independently-acting means for closing each valve, of means operatively connected together for opening and releasing the inlet-valves alternately and means operatively connected together for opening and closing the exhaust-valves alternately.

8. In a valve-gear for steam-engines, the combination with puppet exhaust-valves located respectively at opposite ends of the engine-cylinder, lever-and-link mechanism operatively connected for opening said valves alternately and lost-motion spring connections between said mechanisms and said valves.

9. In a valve-gear for steam-engines, the combination with exhaust-valves located respectively at opposite ends of the engine-cylinder, of lever-and-link mechanisms operatively connected for opening and closing said valves alternately and a lost-motion, spring connection between each valve and the link-and-lever mechanism.

In testimony whereof I have hereunto subscribed my name this 25th day of April, 1900.

CYRUS ROBINSON.

Witnesses:
 H. HORNE,
 SVEND EKMAN.